Feb. 4, 1964 — A. I. BEAN — 3,120,063
CUTTER TESTING MECHANISM
Filed Dec. 2, 1960 — 2 Sheets-Sheet 1

INVENTOR.
ARTHUR I. BEAN
BY John Morton
ATTORNEY

Feb. 4, 1964

A. I. BEAN 3,120,063

CUTTER TESTING MECHANISM

Filed Dec. 2, 1960

*INVENTOR.*
ARTHUR I. BEAN
BY
John Morton
ATTORNEY

United States Patent Office 3,120,063
Patented Feb. 4, 1964

3,120,063
CUTTER TESTING MECHANISM
Arthur I. Bean, Springfield, Vt., assignor to The Fellows Gear Shaper Company, Springfield, Vt., a corporation of Vermont
Filed Dec. 2, 1960, Ser. No. 73,320
4 Claims. (Cl. 33—179.5)

The present invention relates to gear cutting and more particularly to a device for indicating any pitch line runout or eccentricity in a gear cutting tool or its mounting prior to a cutting operation.

Such a device may be mounted on a machine of the type like the well-known Fellows Gear Shaper in which a cutter is mounted on a reciprocating and rotating spindle and placed alongside a work blank mounted on a work spindle. Both spindles are geared to rotate in timed relation while the cutter and its spindle are reciprocated and fed into cutting depth as the cutter teeth pass through the outer periphery of the work blank to form teeth thereon.

The present invention may be used in conjunction with gear finishing machines or thread generating machines or any machines that use a cutter of this type.

This device is mountable on any of the above type machines in which it is desirous to ascertain any pitch line eccentricity or cutter runout in a cutter or its mounting before starting a cutting operation thus enabling the operator to remount the cutter until it will rotate in a concentric pattern of travel.

The eccentricities in cutter mounting are many and are often difficult to determine since a multiplicity of small eccentricities usually occur in the mounting of each single cutter. The cutter itself might, for example, have a runout of minute character between the center of its bore and the pitch line of its teeth. Such an eccentricity may be determined by means such as the type in which the cutter is rotated in mesh with a master gear.

If the center distance variation can be determined it is easy to overcome this eccentricity by positioning the cutter on the spindle to minimize the eccentricity.

The present device can be used as a final check on the mounting of a cutter. If this check is not satisfactory it is possible to remount and recheck the cutter until the best possible condition is obtained and before any unsatisfactory gears have been cut.

Therefore, it is a principal object of the present invention to provide a device of the character described which will enable the reduction of eccentricity thereby eliminating runout of the cutter and in turn eliminating the runout in the gears to be cut.

Another object of the present invention is to provide a device in which the maximum amount of concentricity can be obtained in gears being cut.

Another object of the present invention is to provide a device of the character described which eliminates separate checking of gear shaper cutters before mounting the cutter in cutting position and also affords the opportunity during the finishing of a series of gears to make periodic checks for cutter eccentricity at intervals and thereby eliminate any runout that might be caused by machining.

A further object is to test a cutter for eccentricity and inaccuracies in the cutter itself by employing a master gear running in mesh with the cutter while mounted on the gear shaping machine.

A still further object of the present invention is to provide a means of recording positive error in gear cutting equipment before any cutting damage is caused.

In the drawings.

Like reference characters designate the same parts wherever they occur.

Figure 1:
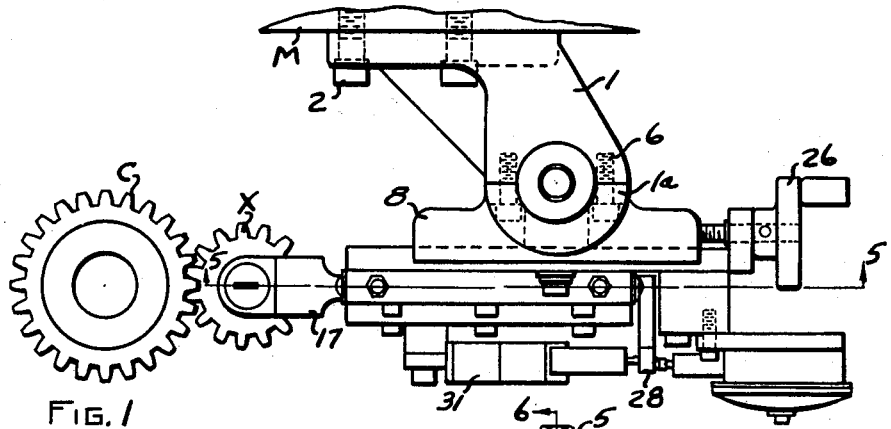
FIGURE 1 is a plan view showing the mechanism of the present invention and the swivel mounting which enables it to be rotated in angular position relative to the machine on which it is mounted.
Figure 2:
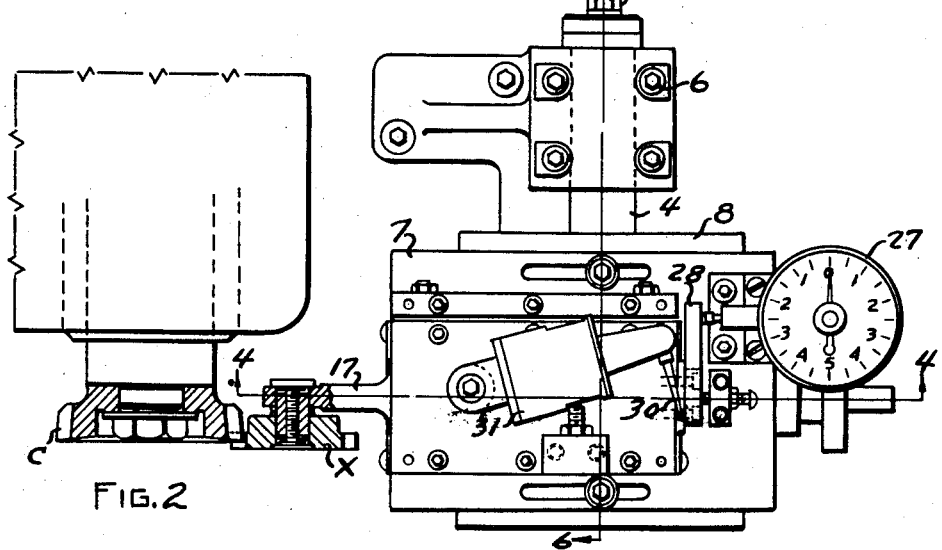
FIGURE 2 is a front view of the device showing the master gear in mesh with the cutter as mounted on the cutter spindle.

A mounting bracket 1 is attached to the machine M by a series of bolts 2. Mounted in bracket 1 is a spindle 4.

Spindle 4 is adjustable in bracket 1 by an elevating screw 5. The front portion of the mounting bracket designated by numeral 1–a clamps spindle 4 to bracket 1 by a series of bolts 6.

On the lower end of spindle 4 a base plate 7 is held on supporting member 8 by bolts 9. Supporting member 8 is held secure to spindle 4 by means of a set screw 10.

Mounted on base plate 7 is a way clamp 11 which is held in place by three bolts 12 which are threaded into base plate 7.

Way clamp 11 has set screws 13 and 14 threaded into each end. These screws can be set to the proper depth then held fixed by nuts 15 and 16 when the necessary sliding tension is obtained on master gear holder 17 which is set in ball bearings 18 between master gear holder ways 19 and 20.

Master gear X is rotatably mounted on master gear holder 17 and may be vertically adjusted through rotation of screw 5 to a higher or lower position depending on the position of the cutter with which it has to mesh.

Figure 5:
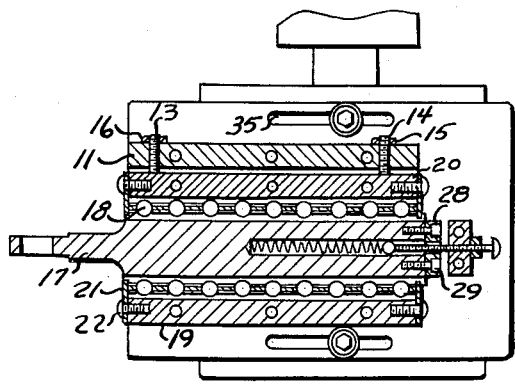
FIGURE 5 is a view taken along line 5—5 of FIGURE 1 showing the master gear holding slide 17 and its manner of mounting.
Figure 6:
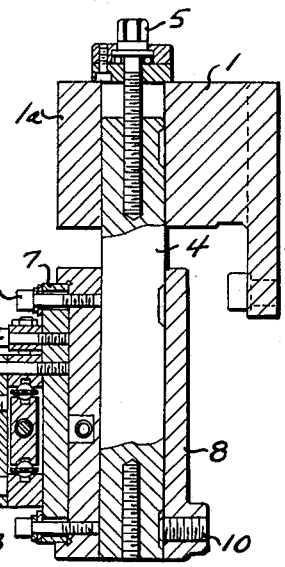
FIGURE 6 is a view taken along line 6—6 of FIGURE 2 showing the swivel spindle mounting of the present invention.

Each end of master gear ways 19 and 20 has a plate 21 held by a screw 22 as seen in FIGURE 5. These plates prevent foreign matter from getting between the sliding member and the ways and also act as grease retainers.

Master gear holder 17 is urged in a forward position by spring 23 to keep master gear X in constant contact with cutter C.

The tension of spring 23 may be varied by rotating screw 24 which is threaded in block 24a fixed to base plate 7. A screw 25 threaded in supporting member 8 and fixed to base plate 7 and having a hand crank 26 is provided to move base plate 7 and master gear holder 17 and master gear X into and out of meshing relationship with cutter C. It will be noted that elongated slots 35 are provided in base plate 7 so that the entire mechanism can be positioned to cope with varying radial diameters of the cutter C and master gear X.

A conventional dial indicator 27 is mounted as shown and has its pointer abutting against a bar 28.

Figure 3:
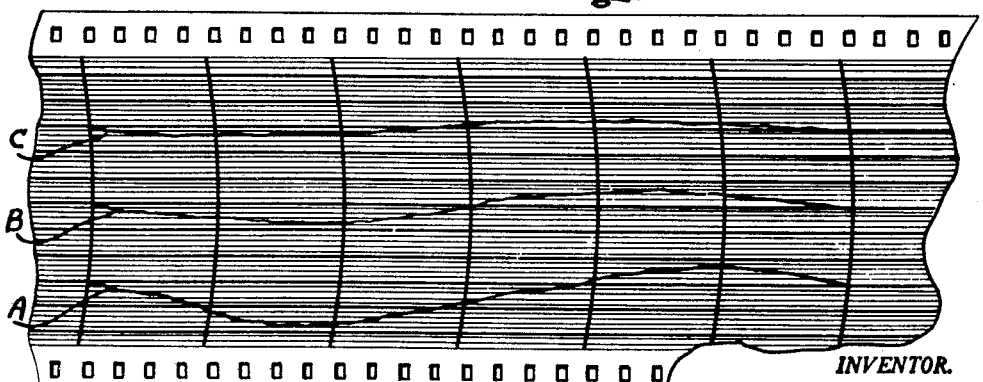
FIGURE 3 is a view of a recording chart illustrating the readings obtained in three separate mountings of a cutter taken during a cutter truing process as described herein.
Figure 4:
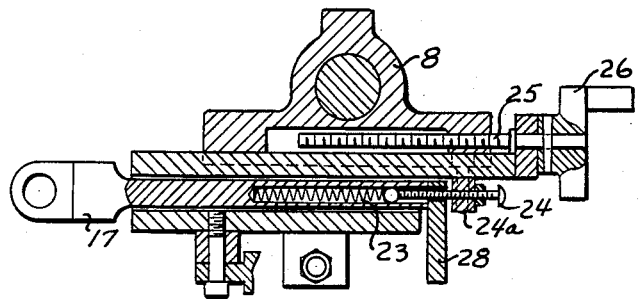
FIGURE 4 is a sectional view taken along line 4—4 of FIGURE 2.

Bar 28 is mounted on master gear holder 17 by means of screws 29. Any endwise movement of master gear holder 17 will reflect a reading on the dial indicator 27 and will also deflect the probe 30 of an electric indicating head 31 which is used for the purpose of amplifying and recording any deflection of probe 30 caused by pitch circle runout or tooth error of cutter C. The amplification transposed by the electric indicating head will be permanently recorded on a chart as shown in FIGURE 3 in the manner well known in the art. This recording is effected through any well known electrical means of transfer from the stylus or probe head to the recording chart, such as for example, a means similar to the apparatus used in Patent No. 2,305,264 issued to S. G. Leonard, Dec. 15, 1942, entitled "Electrical Apparatus for Indicating and Recording the Characteristics of Surfaces."

A set screw adjustment 32 for angularly displacing electric indicating head 31 is mounted on cover plate 33 by means of screw 34.

In FIGURE 3, line A represents an ink line recorded by the electric indicating head 31 during the first run of the master gear X and cutter C after the first mounting. It will be noted that a great variation of pitch line runout is prevalent in this first mounting since the distance between the lines on the recording chart represent ¼ millionth of an inch.

Line B represents a second line drawn in the same manner after a second run of the master gear X and cutter C after the cutter has been loosened and rotated then retightened, here it will be noted that less pitch line runout is obvious because of the lesser curve of the line made by the ink recorder.

Line C represents the final mounting. This line is drawn by the ink recorder during the third rotation of the cutter C and master gear X after cutter C has again been loosened and rotated and then retightened. Here the line is noted to have less curvature which indicates less pitch line runout. With the invention as illustrated herewith and described herein it is possible to take a cutter and find the maximum of pitch line runout, then by repeated mountings and the process of elimination find the correct mounting which will afford the most concentric pattern and which will produce gears with less runout in their teeth.

It has been known to employ a dial indicator or a similar type indicator fixed to the machine to true the cutter but the use of a master gear in the manner taught herein allows a combination check to be obtained which has not been hitherto possible. By use of a master gear rotating in mesh with the cutter it is possible to check to see whether the pitch circle of the cutter is running concentrically. It is also possible to check to see if each tooth in the cutter is correctly formed since obviously any inaccuracy of the cutter such as varied tooth thickness will be reflected in motion of the master gear.

What I claim and desire to secure by Letters Patent is:

1. A device for simultaneously and continuously testing the trueness of a gear cutter and the trueness of its mounting on a gear forming machine during operation wherein said cutter is mounted on a reciprocating rotating spindle and is fed into a work blank mounted on a spindle adapted to rotate in timed relation with the spindle mounting said cutter, said device comprising in combination a stationary mounting bracket, a vertically disposed spindle, one end of said spindle being movably mounted in said bracket, first adjustment means for moving said spindle vertically of said bracket operatively connecting said bracket and said spindle, a supporting member secured to the other end of said spindle so as to be movable with said spindle, a base plate movably mounted on said supporting member, second adjustment means for moving said base plate laterally of said supporting member operatively connecting said supporting member and said base plate, master gear holder ways operatively mounted on said base plate, a master gear holder slideably carried by said ways, a way clamp mounted on said base plate in operative association with said ways so that the sliding contact pressure between said ways and said master gear holder may be varied, a master gear rotatably mounted on said master gear holder and arranged to rotate in mesh with said gear, resilient means connecting said master gear holder to said base plate, said resilient means being adapted to urge said master gear into operative meshing engagement with said cutter, and means operatively connecting said master gear holder to an indicating means so that the lateral movement of said master gear will be indicated whereby the trueness of the gear cutter and the trueness of its mounting will simultaneously and continuously be indicated.

2. A device as set forth in claim 1 wherein said first adjustment means includes a screw means threaded into said spindle and rotatably journaled in said mounting bracket.

3. A device as set forth in claim 2 wherein said second adjustment means includes a screw means threaded in said supporting member and connected to said base plate.

4. A device as set forth in claim 1 wherein said resilient means is adjustable so that the force exerted by said resilient means may be varied.

References Cited in the file of this patent
UNITED STATES PATENTS 2,326,368     Kullman et al. _____ Aug. 10, 1943
2,780,006     Flair _____ Feb. 5, 1957